United States Patent [19]

Young

[11] Patent Number: 4,589,925

[45] Date of Patent: * May 20, 1986

[54] METHODS FOR CLEANING MATERIALS

[75] Inventor: Donald C. Young, Fullerton, Calif.

[73] Assignee: Union Oil Company of California, Los Angeles, Calif.

[*] Notice: The portion of the term of this patent subsequent to Apr. 23, 2002 has been disclaimed.

[21] Appl. No.: 679,235

[22] Filed: Dec. 7, 1984

Related U.S. Application Data

[63] Continuation-in-part of Ser. No. 453,496, Dec. 27, 1982, which is a continuation-in-part of Ser. No. 318,629, Nov. 5, 1981, Pat. No. 4,445,925.

[51] Int. Cl.$^4$ .......................... C23G 1/02; B08B 9/00
[52] U.S. Cl. .................................. 134/3; 134/22.14; 134/38; 134/40; 134/41
[58] Field of Search .................. 134/3, 22.14, 38, 40, 134/41; 252/143, 148

[56] References Cited

U.S. PATENT DOCUMENTS

| | | | |
|---|---|---|---|
| 2,063,972 | 12/1936 | Adams et al. | 252/143 |
| 2,261,700 | 11/1941 | Ryznar | 252/143 X |
| 3,595,799 | 7/1971 | Peterson | 252/148 X |
| 3,642,641 | 2/1972 | Tedeschi et al. | 252/148 |
| 3,655,571 | 4/1972 | Tedeschi et al. | 252/148 |
| 3,776,852 | 12/1973 | Fluchter et al. | 252/143 |
| 4,116,664 | 9/1978 | Jones | 71/549 |
| 4,214,888 | 7/1980 | Young | 71/28 |
| 4,315,763 | 2/1982 | Stoller et al. | 71/29 |
| 4,397,675 | 8/1983 | Young | 71/28 |
| 4,402,852 | 9/1983 | Young | 252/182 |
| 4,404,116 | 9/1983 | Young | 252/182 |
| 4,445,925 | 5/1984 | Young | 71/28 |
| 4,447,253 | 5/1984 | Young | 71/28 |
| 4,512,813 | 4/1985 | Young | 134/27 |

OTHER PUBLICATIONS

*Chemical Abstracts*, vol. 98, "Abstract No. 5745e", 1983, p. 67.

The Condensed Chemical Dictionary, Seventh Edition, Van Nostrand Reinhold Company, New York, 1969, p. 908.

D. F. du Toit, Verslag Akad. Wetenschappen, 22, 573–574, (Abstracted in Chemical Abstracts, 8, 2346, (1914).

L. H. Dalman, "Ternary Systems of Urea and Acids, I. Urea, Nitric Acid and Water, II. Urea Sulfuric Acid and Water, III. Urea, Oxalic Acid and Water"; JACS, 56, 549–553, (1934).

Sulfur Institute Bulletin No. 10 (1964), "Adding Plant Nutrient Sulfur to Fertilizer".

*Primary Examiner*—Arthur L. Corbin
*Attorney, Agent, or Firm*—Dean Sandford; Gregory Wirzbicki; Michael H. Laird

[57] ABSTRACT

Acid-reactive organic and inorganic matter, such as stains and/or deposits, is removed from substrates by contacting such matter with a composition containing urea and sulfuric acid in which the urea/sulfuric acid molar ratio is less than 2. The urea-sulfuric acid compositions may optionally contain other components such as water, surfactants, and/or non-aqueous polar solvents which accentuate the activity of the compositions toward hydrophobic materials. The water-containing compositions which have $H_2O/(urea+H_2SO_4)$ molar ratios below about 2.5 are particularly useful for removing hydrolyzable matter by partial or complete hydroylsis.

47 Claims, No Drawings

METHODS FOR CLEANING MATERIALS

RELATED APPLICATIONS

This application is a continuation-in-part of my co-pending application Ser. No. 453,496, Acid-Catalyzed Reactions and Compositions for Use Therein, filed Dec. 27, 1982, which was a continuation-in-part of then co-pending application Ser. No. 318,629, Methods of Producing Concentrated Urea-Sulfuric Acid Reaction Products, filed Nov. 5, 1981, now U.S. Pat. No. 4,445,925.

BACKGROUND

1. Field of the Invention

This invention relates to the field of materials-cleaning methods, and in particular it relates to methods for removing stains and deposits from substrates.

2. Description of the Art

Substrates of all types, including fabrics, finished surfaces, and fabricated metal, plastic, and ceramic surfaces, can, and often do, become stained or impaired with organic or inorganic pigments, oxidation products (corrosion), algae, mildew and/or other molds, salt accumulations, protenaceous matter, cellulosic matter, etc. A variety of physical and chemical procedures and compositions have been devised to dissolve or physically remove most if not all types of such organic and inorganic stains and deposits. For instance, it is known that acids, such as sulfuric, nitric, hydrochloric, and acetic acids and others, will dissolve a variety of inorganic stains and deposits such as metal salts, carbonates, and other materials and that they will chemically attack and weaken a variety of organic stains and deposits thereby facilitating the removal of such stains and deposits.

Sulfuric acid is one the stongest, readily available acids and, but for a number of significant disadvantages associated with use of sulfuric acid, it is an ideal candidate for the removal of surface stains and deposits. However, sulfuric acid is highly corrosive and therefore is difficult to handle, and it can cause sever corrosive damage to acid-sensitive mateials. It promotes a variety of side reactions with many mateials including dehydration, sulfonation, and oxidation, in which it is consumed, thereby eliminating its activity as an active chemical agent. Its heat of dilution in many solvents, particularly in water, is very high, and therefore the addition of sulfuric acid to water and/or other solvents must be handled with great care. These disadvantages are so severe that they eliminate sulfuric acid as a viable cleaning agent in many circumstances.

Jones, in U.S. Pat. No. 4,116,664, disclosed that the addition of urea to sulfuric acid to form certain combinations of urea and sulfuric acid resulted in a product which was non-toxic, non-caustic, and non-corrosive to black iron and that, therefore, it could be safely transported, handled, stored, and applied, as a fertilizer, with ordinary equipment. Both Jones, supra, and Verdegaal et al. (U.S. Pat. No. 4,310,343) disclose methods for producing certain combinations of urea and sulfuric acid. Verdegaal et al. disclosed methods of manufacturing urea-sulfuric acid compositions which contain at least 50 weight percent urea.

Other authors have also discussed the nature and manufacture of combinations of urea and sulfuric acid. For instance, D. F. du Toit, Verslag Akad. Wetenschappen, 22, 573–4 (abstracted in chemical abstracts, 8, 2346, 1914) and L. H. Dalman, "Ternary Systems of Urea and Acid" JACS, 56, 549–53 (1934), disclosed that urea forms mono- and diurea adducts with sulfuric acid. Dalman also defined the phase relationships between the solid phase and saturated solutions containing urea and sulfuric acid at certain temperatures. While these authors described several characteristics of and methods for manufacturing combinations of urea and sulfuric acid, they did not observe that certain urea-sulfuric acid compositions are particularly active protenating and hydrolyzing agents in which the disadvantages customarily associated with sulfuric acid, such as its dehydrating, sulfonating, and oxidizing activity, are markedly reduced.

SUMMARY OF THE INVENTION

I have now found that urea-sulfuric acid compositions in which the urea/sulfuric acid molar ratio is less than 2, and particularly such compositions in which a substantial proportion of the sulfuric acid is present as the monourea adduct of sulfuric acid, retain a substantial proportion, or essentially all, of the protenating and hydrolyzing activity of sulfuric acid, and that such compositions can be employed to remove acid-reactive organic and/or inorganic matter such as stains and/or deposits from substrates. I have also found that such compositions which also contain water effectively hydrolyze acid-hydrolyzable matter and thereby remove such matter from treated substrates. Urea-sulfuric acid compositions in which the $H_2O/(urea+H_2SO_4)$ molar ratio is less than about 2.5 even more actively and efficiently remove stains and deposits, and they are less corrosive and more stable than compositions in which the $H_2O/(urea+H_2SO_4)$ molar ratio is significantly above 2.5. The useful urea-sulfuric acid compositions can contain optional non-aqueous polar solvents and/or surfactants which act as carriers and diluents for the active urea-sulfuric acid component and which facilitate the activity of such components for the removal of acid-reactive matter which contains hydrophobic substances.

The urea-sulfuric acid components useful in this invention have less dehydrating, oxidizing, and sulfonating activity than does sulfuric acid which is not combined with urea, and their addition to water and other solvents is much less exothermic than is the admixture of sulfuric acid with such materials. Accordingly, the useful urea-sulfuric acid components are easier to handle than is sulfuric acid. They are less corrosive to surface materials and are therefore less damaging. And they are more efficient than is sulfuric acid since sulfuric acid which is combined with urea is not consumed by sulfonation, oxidation, and/or dehydration reactions. Thus, the useful components are more stable and efficient since less material is required to accomplished the same purpose. Urea-sulfuric acid components which have urea/sulfuric acid molar ratios below 2 are more active and efficient protenating and hydrolyzing agents for both organic and inorganic stains and deposits than are compositions which have molar ratios of 2 or higher. Compositions in which the $H_2O/(urea+H_2SO_4)$ molar ratio is below about 2.5 are even less corrosive and more stable than are compositions in which that molar ratio is substantially above 2.5. Accordingly, such compositions are even more active hydrolyzing and protenating agents for both organic and inorganic stains and deposits, and they are even easier to handle and produce less damage to treated surfaces.

DETAILED DESCRIPTION OF THE INVENTION

In accordance with the novel methods of this invention, acid-reactive organic and/or inorganic matter such as stains and deposits is removed from substrates by contacting such matter with a urea-sulfuric acid component in which the urea/$H_2SO_4$ molar ratio is less than 2 under conditions of contact time, temperature, and concentration of the urea-sulfuric acid component which sufficiently weaken or dissolve the acid-reactive matter and thereby facilitate or effect its removal. The urea-sulfuric acid components may also contain water, and such compositions in which the $H_2O$/(urea+$H_2SO_4$) molar ratio is below 2.5 are even more chemically stable and efficient protenating and hydrolyzing agents than are compositions in which that ratio is significantly above 2.5. Thus, they remove stains and/or deposits more rapidly and efficiently than do compositions which have higher relative water concentrations. The useful urea-sulfuric acid components also can contain surfactants and/or non-aqueous polar solvents which accentuate the activity of the urea-sulfuric acid component toward hydrophobic components of stains and deposits. Such non-aqueous polar solvents also can serve as solvent-dispersents for the urea-sulfuric acid component.

The novel methods of this invention can be employed to remove a wide variety of organic and inorganic matter including all materials which are subject to hydrolytic acid attack and/or which are otherwise reactive with sulfuric acid. Thus, these methods can be employed to remove acid-reactive organic and/or inorganic dyes, inks, and other pigments, oxide and salt stains such as corrosion, tarnish, and other oxidative discoloration, deposits which contain oxides, salts, and other acid-reactive materials, resins such as those which occur on bearing metal surfaces (e.g., wheel bearings, machine bearings, etc.) and in fuel systems such as carburetors, fuel injectors, fuel pumps, etc., algae, mildew and other molds, food stains and deposits (e.g. fruit, sauce, jelly, and vegetable stains, and animal and vegetable wastes), etc. The novel methods can also be employed to remove relatively non-acid-reactive materials which overlay acid-reactive materials. For instance, these methods can be employed to remove paint, varnish, metal plating (e.g., chrome plating, etc.) which overlay corrosion and/or salt deposits on metals or other surfaces such as metal oxides and salts (e.g., iron oxides, copper chloride, aluminum oxide, etc.). Illustrative of typical inorganic stains and deposits are metal oxides (e.g., FeO, $Al_2O_3$, MgO, etc.), hydroxides [e.g., $Mg(OH)_2$, $Ca(OH)_2$, etc.], carbonates (e.g., $CaCO_3$, etc.), thiocarbonates, sulfides (e.g., silver tarnish), oxysulfides, and simple and complex organic and inorganic salts such as halides, sulfates, sulfites, bisulfites, phosphates, vanadates, molybdates, formates, oxylates, hypochlorites, oxyhalides such as iodates and perchlorates, silicates, metallo-silicates such as calcium-magnesium silicate, metallo-carbonates such as calcium-magnesium carbonate, nitrates, nitrides, nitrites, permanganates, phosphides, plumbates such as calcium plumbate, plumbites such as calcium plumbite, tungstates such as magnesium tungstate, aluminates, e.g., $NaAlO_2$, antimonates and thioantimonates, e.g., $NaSbO_3$, bismuthates, e.g., $NaBiO_3$, borates, chromates, haloborates, perhenates, e.g., $NaReO_4$, perruthenates, e.g., $KRuO_4$, uranates, e.g., $Na_2UO_4$, perurantes, e.g., $Na_2UO_5$, stannates, e.g., $Na_2SnO_3$, platinates and thioplatinates, metallo-sulfates, e.g., $CaK_2(SO_4)_2$, selenates, e.g., $CaSeO_4$, silicides such as calcium silicide, silicohalides such as calcium silicon floride, arsenates, e.g., $Cu_3(AsO_4)_2$, bromates such as copper bromate, cyanides, metallo-cyanides such as ferricyanides, metallohalides, e.g., $CuCl_2.2KCl$, and the like. Probably the most common inorganic stains and deposits outside of the chemical processing, mining, and petroleum industries, are corrosion and hard water deposits.

Such stains and deposits can result from the exposure of a surface to the environment or processing conditions (e.g., metal oxidation and scaling which results during manufacture of metal articles), soiling during use, manufacture, or exposure to electrical discharge, fire or smoke. The surfaces of engine components (including peripheral equipment) and other mechanical parts can become stained or impaired by deposits such as resins which result from wear and/or decomposition of lubricants and fuels, while tiles, bricks, and other ceramic and nonceramic articles can become stained and/or can accumulate deposits from the use of mortars and grouts during their installation.

The methods of this invention can be used to remove stains and/or deposits from a wide variety of materials including ferrous and nonferrous metals, plastics, elastomers, ceramics, wood, and glass, and substrate materials that are lined with such substances. Typical ferrous metals include carbon steels, black iron, cast iron, and stainless steels, including both high and low alloy stainless steels containing chromium, molybdenum, nickel, vanadium, rare earth metals, and/or other components. Illustrative non-ferrous metals include aluminum, titanium, magnesium, zinc, tin, chromium, and materials which are plated with and/or alloyed with such metals.

Essentially, all plastic and elastomeric materials can be treated by the methods of this invention with several exceptions. The useful urea-sulfuric acid components hydrolyze nylons, rayons, cellulosics such as cotton, and protenaceous materials such as leathers, and they should not be employed to treat articles constructed of or containing functioning components constructed of such materials except under mild treatment conditions, e.g., short contact times and/or low contact temperatures. Typical plastic and elastomeric materials include polyvinylchlorides, polyolefins such as polyethylene and polypropylene, polyacrylates, polystyrene, phenol-formaldehyde resins, styrene-butadiene elastomers, and other synthetic materials.

Illustrative of other substrates which can be treated by these methods are ceramics such as ceramic tiles, cement, grout, and the like, and essentially all forms of wood and glass. It should be observed, however, that the useful urea-sulfuric acid components gradually hydrolyze wood; therefore, wooden surfaces should be treated only under moderate conditions of time, temperature, and/or concentration of the urea-sulfuric acid component.

Thus, the methods of this invention can be employed to remove acid-reactive matter from a wide variety of relatively non-acid-reactive articles and or surfaces including synthetic fabrics, finished surfaces, and fabricated metal, plastic, and ceramic articles and/or surfaces. Typical fabrics include woven and nonwoven synthetic cloths, filters, carpets, drapes, upholstery fabric, and the like. Typical finished surfaces include surfaces which are painted or otherwise coated with relatively acid resistant materials such as paneling, furniture, flooring, and exterior and interior wall surfaces. Illustrative fabricated metal articles include metal wire, plate, beams, engine and other mechanical parts, fuel systems, dinnerware, cookware, and other machined, cast, and forged articles including the exterior and interior surfaces of tubing, pipes, and other conduits of all varieties including in-line equipment such as orifices, nozzles, valves, screens, filters, metering devices, heat exchange equipment, radiators, boiler and furnace tubes, and wells including water, geothermal, oil, and water injection wells such as those employed in the Frasch sulfur process. Thus, the methods of this invention can be employed to pickle or descale hot-formed metals such as wire, metal plate, and cast and milled metal articles, to remove scale or corrosion from manufactured or used metal articles, and to remove metal oxides, sulfides, and other tarnishes or coatings that result from use or exposure of metal articles such as silver tarnish (silver sulfide) either to clean such articles or to prepare them for further treatment such as anodizing, plating or otherwise coating, welding or otherwise bonding, etc. They can be employed to remove resins or other wear-deposit accumulation from mechanical parts such as engine parts, bearings, fuel systems (fuel lines, pumps, carburetors, fuel injectors, etc.), and to remove stains and accumulations such as blood stains and dairy product accumulations from food processing equipment and containers. They can also be employed to remove stains and/or deposits from essentially all varieties of industrial process, water, and steam handling conduits and in-line equipment (e.g., heat exchangers furnace and boiler tubes, etc.), municipal, household, and office water supply and drain systems, steam operated electrical generating systems, agricultural water supplies, e.g., irrigation systems, and the like.

The useful urea-sulfuric acid components are combinations of urea and sulfuric acid (in the presence or absence of other components) in which the urea/sulfuric acid molar ratio is less than 2. Within this range of molar ratios, at least a portion of the sulfuric acid is present as the monourea adduct of sulfuric acid. I have found that the monourea adduct of sulfuric acid efficiently and rapidly weakens and/or removes acid-reactive and/or hydrolyzable stains and deposits. In contrast, the diurea adduct of sulfuric acid, the only form which exists in mixtures that have urea/sulfuric acid molar ratios above 2, has much less ability to hydrolytically attack acid-sensitive components, particularly the hydrolyzable materials such as protenaceous and cellulosic deposits referred to above. Accordingly, the useful urea-sulfuric acid components will usually have urea/sulfuric acid molar ratios of at least about ¼ and less than 2, generally about ¼ to about 7/4. The more preferred compositions, which contain less uncomplexed sulfuric acid, have urea/sulfuric acid molar ratios of at least about ½, generally about ½ to about 3/2. The most preferred urea-sulfuric acid components have urea/sulfuric acid molar ratios of at least about 1/1 such that all of the sulfuric acid is complexed with urea as either the mono- or diurea adduct. It is also preferable to assure that a substantial portion of the sulfuric acid is present as the mono- rather the diurea adduct; thus, the most preferred compositions are those which have urea/sulfuric acid molar ratios within the range of about 1/1 to about 3/2.

The urea-sulfuric acid components contain sufficient urea and sulfuric acid to weaken or remove the treated stain or deposit within a reasonable period of time. I have found that catalytic amounts of urea and sulfuric acid, i.e., about 1 weight percent in aqueous or nonaqueous solutions, are sufficient for this purpose in many instances. However, higher urea and sulfuric acid concentrations produce higher rates of hydrolysis and/or acid attack and are often preferred, particularly for the treatment of stains and deposits which contain hydrolyzable components such as protenaceous and cellulosic matter. Accordingly, the urea and sulfuric acid, in combination, will usually constitute at least about 1, generally at least about 5, and preferably about 5 to 100 weight percent of the composition (in the presence or absence of other solvents, diluents, adjuvants, or other components). More concentrated compositions are preferred for the treatment of more refractory stains and deposits, and, in such compositions, the urea and sulfuric acid, in combination, will often constitute at least about 30, preferably at least about 60, and even 80 percent or more of the urea-sulfuric acid component.

Water is a preferred component of urea-sulfuric acid components which are employed to remove hydrolyzable stains or deposits, and it can be present in very minor amounts of at least about 0.2 weight percent. The useful urea-sulfuric acid components can also be very dilute, e.g., they can contain up to 99 weight percent water or more. Accordingly, water concentration can range from about 0.2 to about 99 weight percent but will generally be within the range of about 0.2 to about 90 weight percent, preferably about 0.5 to about 70 weight percent, based on the combined weight of urea, sulfuric acid, and water. Of course, the more concentrated urea-sulfuric acid components referred to above which are preferred for treating more refractory stains and deposits will have correspondingly lower water concentrations. Urea-sulfuric acid components which are particularly preferred for the treatment of more refractory and/or hydrolyzable stains and deposits have $H_2O/(urea+H_2SO_4)$ molar ratios below 2.5 since such compositions are substantially more effective for the removal of such materials. The urea and sulfuric acid, in combination, constitute at least about 60 weight percent of these preferred components based on the combined weight of urea, sulfuric acid, and water. Without being constrained to any particular theory explaining this effect, and without limiting the scope of this invention thereby, it appears that the presence of sufficient water to provide 3 or more moles of water per mole of urea and 2 or more moles of water per mole of sulfuric acid (the amount of water required to hydrate those respective components) attenuates the activity of the urea-sulfuric acid component for the protonic-hydrolytic attack of refractory and/or hydrolyzable stains and deposits.

As discussed in my copending application Ser. No. 673,508, Thermally Stable Urea-Sulfuric Acid Compositions and Methods of Manufacture, filed Nov. 20, 1984, which is incorporated herein by reference in its entirety, urea-sulfuric acid compositions which contain less than about 1 weight percent water (based on water, urea and sulfuric acid) are much more thermally stable than are compositions which have substantially higher water concentrations. For instance, urea-sulfuric acid compositions which have urea/sulfuric acid molar ratios of about 1 and which contain about 10 weight percent water have incipient decomposition temperatures of about 176° F. (80° C.) and decompose explosively at about 190° to 200° F. (about 90° C.). Incipient decomposition temperature is that temperature at which the urea-sulfuric acid component begins to decompose as indicated by effervescence ($CO_2$ evolution) and/or discoloration of the composition, as discussed in my above referenced application Ser. No. 318,629 which is incorporated herein by reference in its entirety. In contrast, otherwise identical urea-sulfuric acid compositions which contain about 1 weight percent water or less can be heated to temperatures above 80° C. and even above 90° or 100° C. without incipient decomposition. The advantages of employing such low water-content compositions are evident when it is desired to treat stains or deposits at temperatures of 80° C. or higher.

The useful urea-sulfuric acid components may optionally contain other components which do not negate the activity of the useful components for weakening or removing stains or deposits. In fact, the use of urea-sulfuric acid components which contain polar solvents (other than water) and/or surfactants is sometimes preferred, particularly for the treatment of deposits or obstructions which contain hydrophobic substances such as lignins, fatty materials, e.g., lipids, and the like. Illustrative solvents include organic and inorganic solvents in which both urea and sulfuric acid are soluble such as dimethylsulfoxide; alcohols, e.g., methanol, glycol, etc., ketones such as acetone, methylethylketone, tetrahydrofuran; halogenated hydrocarbons such as trichloromethane and chloroform, and the like. One or more of such polar solvents can be present over a wide range of concentration and usually within the range of about 2 to about 95 weight percent based on the combined weight of solvents, urea, and sulfuric acid. Solutions of urea in excess sulfuric acid, with or without additional solvent, can also be employed. Water is usually the most preferred solvent due to its affinity and lack of reactivity with urea and sulfuric acid.

Suitable surfactants are discussed in my copending application Ser. No. 453,496, Acid Catalyzed Reactions and Compositions for Use Therein, filed Dec. 27, 1982, which is incorporated herein by reference in its entirety. Illustrative of useful surfactants are nonionics such as the alkylphenol polyethylene oxides, anionics such as the long-chain alkylsulfonates, and cationics such as 1-hydroxyethyl-2-heptadecenyl gloxalidin. Of these, the polyethylene oxide nonionic surfactants are particularly preferred. Illustrative of preferred specific surfactants is the nonionic surfactant marketed by Thompson-Hayward, Inc. under the trademark T-MULZ 891. Surfactants can be employed over a wide range of concentrations. Useful surfactant concentrations are usually at least about 0.1 and are typically about 0.1 to about 10 weight percent based on the combined weight of surfactant, urea, sulfuric acid, and solvent (if present).

The urea-sulfuric acid components can also contain corrosion inhibitors, and the presence of such inhibitors is particularly preferred when the composition of the treated surface is subject to acid attack. Corrosion inhibitors which are particularly suitable for use with solutions which contain urea and sulfuric acid are discussed in my applications Ser. Nos. 330,904 and 331,001, now U.S. Pat. Nos. 4,404,116 and 4,402,852, respectively, both of which were filed Dec. 15, 1981, and which are incorporated herein by reference in their entireties.

Useful urea-sulfuric acid components can be prepared by mixing urea and the selected solvent(s) (if any), and sulfuric acid under conditions sufficient to avoid excessive heating of the solution due to the heat of dilution and adduct formation. The heats of dilution of urea and sulfuric acid and of adduct formation are so great that the amount of heat released (particularly in the manufacture of solutions which have higher sulfuric acid concentrations) can cause the mixture to boil, explode, and/or exceed the thermal decomposition temperature of urea, acid, or the urea-acid adduct. Procedures suitable for manufacturing the more concentrated solutions of urea and sulfuric acid and for determining incipient decomposition temperature are discussed in my applications Ser. Nos. 318,343 and 318,629, both of which were filed Nov. 5, 1981, now U.S. Pat. Nos. 4,397,675 and 4,445,925, respectively, and which are incorporated herein by reference in their entireties. While those applications were specifically directed to the manufacture of concentrated aqueous urea-sulfuric acid solutions, the procedures described therein can also be employed to control the substantial exotherms involved in the production of urea-sulfuric acid components in other solvents.

The stain or deposit to be removed should be contacted with a sufficient quantity of the useful urea-sulfuric acid component to completely treat all exposed portions of the stain or deposit for a period of time and at a temperature sufficient to at least significantly weaken, if not remove, the stain or deposit. Such contacting can be efficiently achieved by either spraying, dipping, or otherwise coating the treated subtrate with the selected urea-sulfuric acid component. Contact times of as little as 1 minute are adequate to significantly weaken the more susceptible stains and deposits such as the inorganic materials referred to above, particularly when they are treated with the more concentrated urea-sulfuric acid components at higher temperatures. However, contact times of at least about 5 minutes are generally employed. Longer contact times are preferred to remove larger deposits and more refractory materials such as protenaceous and cellulosic stains and deposits, particularly when they contain hydrophobic substances. Thus, contact times will usually range from about 1 minute to about 48 hours, typically about 5 minutes to about 24 hours, and preferably at least about 10 minutes to about 24 hours.

The useful urea-sulfuric acid components will chemically attack and weaken all types of acid-reactive matter at relatively low temperatures, e.g., 0° C. However, reaction rate increases as temperature is increased. Thus, contacting temperatures will usually range from about 0° C. to about 80° C. with urea-sulfuric acid components which contain substantially more than 1 weight percent water based on the combined weight of water, urea, and sulfuric acid. As mentioned above, thermally stable urea-sulfuric acid components which contain about 1 weight percent water or less also can be employed. Such thermally stable components can be contacted with deposits at temperatures in excess of 80° C. or, if desired, in excess of 90° C. or even 100° C. or higher.

The invention is further described by the following examples which are illustrative of specific modes of practicing the invention and are not intended as limiting the scope of the invention as defined by the appended claims.

EXAMPLE 1

Rusted carbon steel tools, the surfaces of which are partially covered by acrylic enamel paint residue, can be cleaned by soaking at 24° C. for 12 hours in a solution of urea and sulfuric acid in water having a urea/sulfuric acid molar ratio of 1 and an $H_2O(urea+H_2SO_4)$ molar ratio of 2 containing 5 weight percent T-MULZ 891 to remove both the surface rust and paint residue. The paint residue is apparently removed primarily by removal of surface corrosion (rust) underlying the paint deposits.

EXAMPLE 2

Hard water deposits on the interior of ½ inch I.D. No. 310 stainless steel heat exchanger tubes can be removed by filling the tubes with a urea-sulfuric acid component having a urea/$H_2SO_4$ molar ratio of 1.4 containing 20 weight percent water and 80 weight percent of the combination of urea and sulfuric acid for 1 hour at 70° C.

While particular embodiments of the invention have been described, it will be understood, of course, that the invention is not limited thereto since many obvious modifications can be made, and it is intended to include within this invention any such modifications as will fall within the scope of appended claims.

Having described my invention, I claim:

1. A method for removing matter from a substrate, which method comprises the step of contacting said matter with a composition comprising urea and sulfuric acid in which the urea/sulfuric acid molar ratio is within the range of about ½ to less than 2, and said urea and sulfuric acid, in combination, comprise at least about 30 weight percent of said composition.

2. The method defined in claim 1 wherein said matter comprises a member selected from the group consisting of organic and inorganic stains, dyes, and pigments, resins, algae, mold, proteinaceous matter, cellulosic matter, metal sulfides, oxides, hydroxides, carbonates, thiocarbonates, and simple and complex metal salts, and combinations thereof.

3. The method defined in claim 1 wherein said matter comprises hydrophobic matter, and said composition comprises water and a member selected from the group consisting of surfactants, solvents, and combinations thereof.

4. The method defined in claim 1 wherein said composition comprises water and a member selected from the group consisting of surfactants, solvents, and combinations thereof.

5. The method defined in claim 1 wherein said urea/sulfuric acid molar ratio is within the range of about ½ to about 3/2, said urea and sulfuric acid, in combination, constitute at least about 60 weight percent of said composition, and said composition is contacted with said matter for a period of at least about 5 minutes.

6. The method defined in claim 1 wherein said urea/sulfuric acid molar ratio is within the range of about 1/1 to about 3/2, said urea and sulfuric acid, in combination, constitute at least about 60 weight percent of said composition, and said composition is contacted with said matter for a period of at least about 5 minutes.

7. The method defined in claim 1 wherein said substrate is selected from the group consisting of fabrics, finished surfaces, and fabricated metal, plastic and ceramic articles, and combinations thereof, said urea/sulfuric acid molar ratio is within the range of about ½ to about 3/2, and said composition is contacted with said matter for a period of at least 5 minutes.

8. The method defined in claim 7 wherein the $H_2O(urea+H_2SO_4)$ molar ratio in said composition is less than about 2.5, and said urea/sulfuric acid molar ratio is within the range of about 1/1 to about 3/2.

9. The method defined in claim 7 wherein said urea and sulfuric acid, in combination, constitute at least about 60 percent of said composition.

10. The method defined in claim 9 wherein said urea/sulfuric acid molar ratio is within a range of about 1/1 to about 3/2, and said matter comprises a member selected from the group consisting of metal oxides, sulfides, hydroxides, carbonates, thiocarbonates, and simple and complex metal salts, and combinations thereof.

11. The method defined claim 1 wherein said composition contains about 1 weight percent water or less based on the combined weight of said urea and said sulfuric acid.

12. The method defined in claim 11 wherein said composition is contacted with said matter at a temperature above 80° C.

13. The method defined in claim 11 wherein said composition is contacted with said matter at a temperature above about 90° C.

14. The method defined in claim 1 wherein said matter comprises acid-hydrolyzable matter, said urea/sulfuric acid molar ratio is at least about 1/1, and said composition comprises water.

15. The method defined in claim 14 wherein said hydrolyzable matter is selected from the group consisting of proteinaceous matter, cellulosic matter, and combinations thereof, and the $H_2O/(urea+H_2SO_4)$ molar ratio in said composition is less than about 2.5.

16. The method defined in claim 15 wherein said composition further comprises a surfactant.

17. The method defined in claim 1 wherein said composition further comprises a non-aqueous polar solvent.

18. The method defined in claim 17 wherein the $H_2O/(urea+H_2SO_4)$ molar ratio in said composition is less than about 2.5.

19. The method defined in claim 1 wherein said urea and said sulfuric acid, in combination, constitute at least about 60 weight percent of said composition, and said matter comprises a member selected from the group consisting of organic and inorganic stains, dyes and pigments, resins, algae, mold, proteinaceous matter, cellulosic matter, metal oxides, sulfides, hydroxides, carbonates, thiocarbonates, and simple and complex metal salts, and combinations thereof.

20. The method defined in claim 19 wherein said urea and said sulfuric acid, in combination, constitute at least about 80 weight percent of said composition.

21. The method defined in claim 19 wherein said matter comprises acid-hydrolyzable matter, said urea/sulfuric acid molar ratio is at least about 1/1, and said composition comprises water.

22. The method defined in claim 1 wherein said substrate comprises the interior of a conduit, and said matter is selected from the group consisting of algae, mold, metal sulfides, oxides, hydroxides, carbonates, thiocarbonates, and simple and complex metal salts, and combinations thereof.

23. The method defined in claim 22 wherein said conduit constitutes a component of fluid-heat exchange equipment.

24. The method defined in claim 1 wherein said substrate is selected from metallic engine parts, bearing surfaces, and fuel systems.

25. The method defined in claim 1 wherein said substrate comprises a metal surface, and said matter is selected from the group consisting of metal sulfides, oxides, hydroxides, carbonates, thiocarbonates, and simple and complex metal salts, and combinations thereof.

26. The method defined in claim 25 wherein said matter comprises oxidation products of said metal surface.

27. A method for removing matter from a substrate, which method comprises the step of contacting said matter with a composition comprising urea and sulfuric acid in which the urea/sulfuric acid molar ratio is about 1/1 to about 3/2, said urea and sulfuric acid, in combination, constitute at least about 30 weight percent of said composition, and said matter is selected from the group consisting of organic and inorganic stains, dyes and pigments, resins, algae, molds, proteinaceous matter, cellulosic matter, metal sulfides, oxides, hydroxides, carbonates, thiocarbonates, and simple and complex metal salts, and combinations thereof.

28. The method defined in claim 27 wherein the $H_2O/(urea+H_2SO_4)$ molar ratio in said composition is less than 2.5.

29. The method defined in claim 27 wherein said composition contains less than about 1 weight percent water.

30. The method defined in claim 29 wherein said composition is contacted with said matter at a temperature of at least about 90° C.

31. A method for removing acid-hydrolyzable matter from a substrate, which method comprises the step of contacting said acid-hydrolyzable matter with a composition comprising urea, sulfuric acid, and water, in which the urea/sulfuric acid molar ratio is within the range of about 1/1 to about 3/2, and wherein the $H_2O/(urea+H_2SO_4)$ molar ratio in said composition is less than about 2.5.

32. The method defined in claim 31 wherein said hydrolyzable matter is selected from the group consisting of stains, dyes, pigments, resins, algae, mold, proteinaceous matter, and cellulosic matter, and combinations thereof.

33. A method for removing matter from a metal surface, which method comprises the step of contacting said matter with a composition comprising urea and sulfuric acid in which the urea/sulfuric acid molar ratio is within the range of about ½ to about 3/2, said urea and sulfuric acid, in combination, constitute at least about 30 weight percent of said composition, and said matter is selected from the group consisting of metal sulfides, oxides, hydroxides, carbonates, thiocarbonates, and simple and complex metal salts, and combinations thereof.

34. The method defined in claim 33 wherein said urea/sulfuric acid molar ratio is within the range of about 1/1 to about 3/2, and said urea and sulfuric acid, in combination, constitute at least about 60 weight percent of said composition.

35. The method defined in claim 33 wherein said composition further comprises water, and the $H_2O/(urea+H_2SO_4)$ molar ratio in said composition is less than 2.5.

36. The method defined in claim 33 wherein said composition contains less than about 1 weight percent water.

37. The method defined in claim 36 wherein said composition is contacted with said matter with a temperature of at least about 90° C.

38. A method for removing a resinous deposit from a metal surface, which method comprises the step of contacting said deposite with a composition comprising urea and sulfuric acid in which the urea/sulfuric acid molar ratio is within the range of about ½ to about 3.2, and said urea and sulfuric acid, in combination, constitute at least about 30 weight percent of said composition.

39. The method defined in claim 38 wherein said metal surface is selected from the group consisting of mechanical bearing surfaces and fuel system components.

40. The method defined in claim 38 wherein said urea/sulfuric acid molar ratio is within the range of about 1/1 to about 3/2, the $H_2O/(urea+H_2SO_4)$ molar ratio of said composition is less than 2.5, and said composition comprises a member selected from the group consisting of solvents, surfactants, and combinations thereof.

41. The method defined in claim 38 wherein said composition contains less than about 1 weight percent water.

42. The method defined in claim 41 wherein said composition is contacted with said deposit with a temperature of at least about 90° C.

43. A method for removing a deposit from the interior of fluid heat exchange equipment, which method comprises the step of contacting said deposit with a composition comprising urea and sulfuric acid in which the urea/sulfuric acid molar ratio is within the range of about ½ to about 3/2, and said urea and sulfuric acid, in combination, constitute at least about 30 weight percent of said composition.

44. The method defined in claim 43 wherein said urea/sulfuric acid molar ratio is within the range of about 1/1 to about 3/2, the $H_2O/(urea+H_2SO_4)$ molar ratio in said composition is less than 2.5, and said deposit comprises matter selected from the group consisting of metal sulfides, oxides, hydroxides, carbonates, thiocarbonates, and simple and complex metal salts, and combinations thereof.

45. The method defined in claim 43 wherein said composition contains less than about 1 weight percent water.

46. The method defined in claim 45 wherein said composition is contacted with said deposit with a temperature of at least about 90° C.

47. A method for removing matter from a surface which method comprises the step of contacting said matter with a composition comprising urea and sulfuric acid wherein said urea and sulfuric acid, in combination, constitute at least about 60 weight percent of said composition, and the molar ratio of urea to sulfuric acid is within the range of about 1/1 to about 3/2.

* * * * *

UNITED STATES PATENT AND TRADEMARK OFFICE
CERTIFICATE OF CORRECTION

PATENT NO. : 4,589,925
DATED : 05/20/86
INVENTOR(S) : Donald C. Young

It is certified that error appears in the above-identified patent and that said Letters Patent are hereby corrected as shown below:

Col. 12, Claim 38, line 11 "deposite" should read —deposit—.

Col. 12, Claim 38, line 13 "3.2" should read —3/2—.

Signed and Sealed this

Fourteenth Day of April, 1987

Attest:

DONALD J. QUIGG

Attesting Officer

Commissioner of Patents and Trademarks